July 3, 1956
P. S. MacMICHAEL
2,752,886
ANIMAL RESTRAINING DEVICE
Filed Aug. 2, 1954
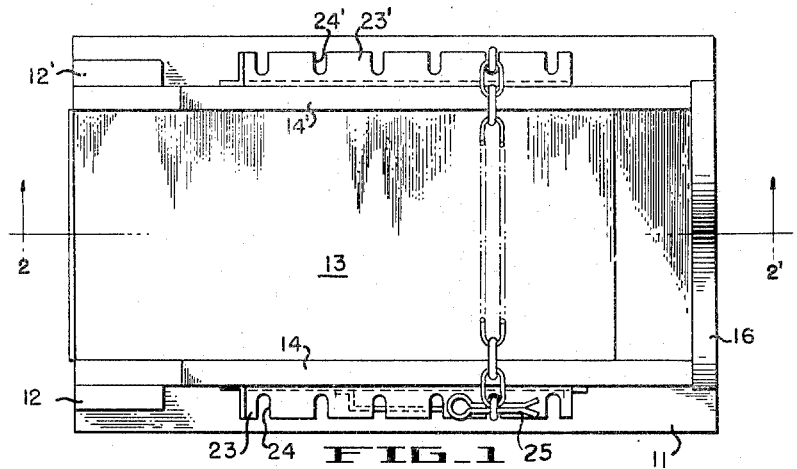
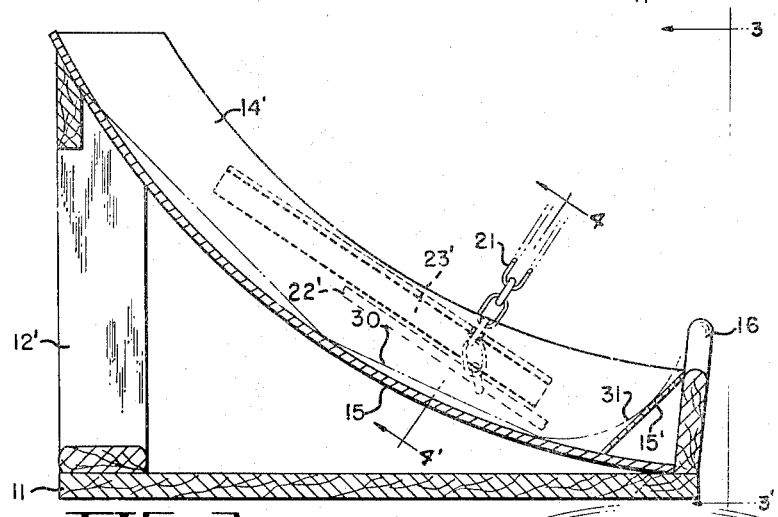
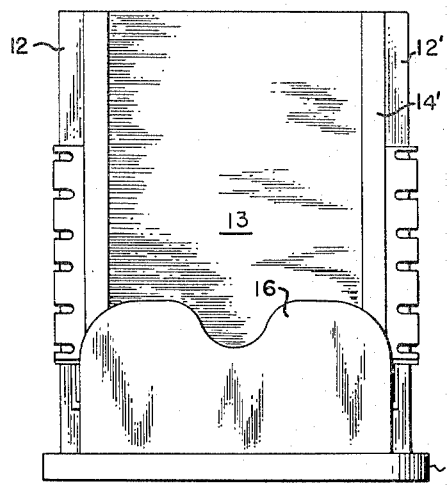
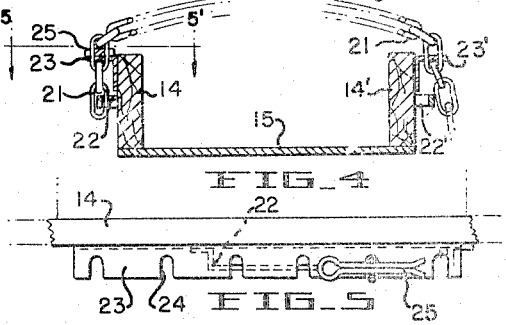
INVENTOR.
Paul S. MacMichael

United States Patent Office 2,752,886
Patented July 3, 1956

2,752,886

ANIMAL RESTRAINING DEVICE

Paul S. MacMichael, Sonoma, Calif.

Application August 2, 1954, Serial No. 447,042

5 Claims. (Cl. 119—103)

This invention relates to animal restraining devices and more particularly to a device adapted to hold and restrain in the desired position an animal such as a lamb while performing thereon certain operations such as docking, castrating, ear tagging, branding, and giving treatments such as vaccinating, hypodermic injections, and medicine, all commonly referred to as marking.

An object of this invention is to provide a simple, light weight, easily portable restrainer which in use may eliminate the general practice of having a man standing, holding and restraining an animal the entire time that it is being operated on by the marker, thereby effecting a substantial saving in the labor commonly used.

Another of the objects is to provide a restrainer to enable one man working alone to mark lambs instead of requiring two men working together as restrainer and marker respectively as is now commonly the practice.

Other objects and advantages will become apparent in the descriptive matter and claims, and by reference to the drawings wherein:

Figure 1 is a plan view of the restrainer device.

Figure 2 is a longitudinal sectional elevation on the line 2—2' of Fig. 1.

Figure 3 is an end elevation viewed from the line 3—3' of Figure 2.

Figure 4 is a partial cross section on the line 4—4' of Figure 2.

Figure 5 is an enlarged partial plan viewed on the line 5—5' of Figure 4.

Referring to the drawings, the structure of the restrainer may be formed of plywood parts screwed together, with an oblong base board 11 carrying two head end corner posts 12 and 12' supporting the elevated head end of the cradle 13 with its low side walls 14 and 14' and its floor 15 which may be flat laterally, but longitudinally extends from said head end on a concave curving line downward to almost horizontal near its tail or near rump end where a short upward slanted floor part 15' finishes against the rump end wall 16 which extends about vertically upward a short distance while being formed with a central rounded V-notch tail passageway open up from the top level of said floor part 15', said wall 16 extending downward to said supporting base board 11.

A restraining chain 21 of type shown freely flexible laterally in any direction and is provided of ample length to be passed across an animal placed in the cradle 13 and secured and held taut by anchorage means on said sides 14 and 14', said means comprising a metallic bar 22 slideably encircled by one end link of said chain 21, said bar 22 at its ends being attached in spaced out position and lengthwise on said cradle side 14 so that said chain link may readily be slid along within the length of said bar 22. Attached near the upper edge of said side 14 and parallel to said bar 22 therebelow is a metallic, projecting flange 23 having a plurality of longitudinally spaced open end slots 24 in any one of which selectively, a link of said chain 21 may engage, thereby anchoring it against lengthwise movement while the chain is held taut in place. On far side 14' of the cradle in similar manner is like flange 23' with slots 24'.

The size and length of the links of said chain 21, and the size of the bar 22, and its position relative to that of flange 23 are all correlated so that with a first link slideably encircling said bar 22, the top of the second link comes cross-wise just under said flange 23 slot and the third link can be passed into a slot 24 while permitting a split cotter pin 25 to be passed through said third link and rest on said flange 23 while almost contacting the end of the next link above, all in such a manner as to prevent pulling said third link and chain 21 laterally out of the slot 24 unless the cotter pin 25 is first removed. This novel result is due in part to a binding action on the flange 23 between the top of the second link pressed up and the cotter pin 25 pressed down. Also in part by a binding action between the first link pulled up against said bar 22 and said cotter pin 25 pressed on said flange 23, and in practical use has proven reliable for its purpose.

Said arrangement is also such as to cause the main upward operating pull on the chain 21 to be resisted by pressure of the second link up against said flange 23 instead of by a pull up on the relatively weaker bar 22 slideably positioning said first link.

With the usual flock of lambs, mostly not greatly different in size, the operator may on the near side 14 anchor the near end of the chain 21 in the preferred one of slots 24 by means of said cotter pin 25. If an occasional lamb may best be held with the chain 21 in some other slot 24, the operator drops back the free part of the chain 21 and engages the desired slot 24 with another link for that off sized lamb while normally using only the preferred slot 24 retained by the cotter pin 25.

In usual operation an animal is placed on its back in the cradle 13 with its rump end or hips against the end wall 16, its tail projecting therethrough, its hind legs pressed up against its chest, and said chain 21, with one end positioned in a selected slot 24 in flange 23, is drawn taut across said animal and anchored in selected slot 24' of said flange 23'.

To make the restrainer equally convenient for use by a left handed operator a bar 22', a duplicate in relative position and function to said bar 22, is attached on cradle side 14' and encircled by the end link of a chain 21' (not shown). When not in use it may be kept tied out of the way.

The drawing and foregoing description covers a preferred form of this animal restrainer, developed and proven by marking some thousands of lambs by various experienced sheep men on their respective ranches. It is adapted to simple, economical, rugged construction with mainly plywood forming the cradle.

Modifications may be made within the principles of this invention. As examples: the floor longitudinal alignment might be approximated by longitudinally flat pieces with the surface line 30 lightly indicated in Figure 2 and the rump end part might be formed on the curving line 31 with metallic construction; flexible cord and workable anchorage might replace the chain and anchorage shown. Other available materials might be used, cast aluminum for instance, and details changed to effect the simplest manufacture therewith. The foregoing and other modifications within the spirit of the invention may occur to those skilled in the art. It is therefore to be understood that changes in details of construction, arrangement and combination of parts may be resorted to provided they fall within the principles of the invention and the scope of the appended claims.

No other animal restraining device adapted for use in marking lambs being hitherto available in the market, the ordinary procedure hitherto has been to corral the lambs in a small fenced pen wherein they are then caught by a man commonly referred to as a catcher who carries a lamb to the pen fence and stands there holding it firmly the entire time that the man (marker) standing outside the pen performs such marking as required (see first paragraph hereof) and then drops the lamb outside the pen.

The cradle is so designed that it holds the lamb in the best possible position for marking. By using cradles, a marker who otherwise requires up to three catchers can be kept busy by one. Some cradle method catchers are able to keep two markers busy. Sheep men comment on the fact that the lamb rests easier and is much less distressed than when held by hand.

Some other small animals may also be held in the cradle. For instance, while its horns were burned off, a fighting kid has been fastened in the cradle and held quietly, except of course, its head had to be held manually.

What I claim is:

1. An animal restraining device comprising the combination of a supporting base; a narrow shallow cradle supported by said base and having a floor elevated at a head end and with a major portion sloped concavely downward to a low level and a minor portion thence sloping sharply upward to a tail end, said cradle having a pair of generally vertical side walls, one on each side of said floor, each with an inner face facing said floor and an outer face, said cradle also having a substantially vertical tail end wall supported on said base and extending substantially upward above said tail end floor level and provided with a central vertical notch therein; a pair of outwardly projecting flanges with one secured to the outer face of each said side wall in between said head and tail ends and longitudinally sloping downward towards said tail end, each of said flanges having a plurality of spaced-apart open slots extending inward toward said walls; a bar supported adjacent its ends by one said outer wall parallel to and spaced below one said flange; and a freely flexible link chain having one end slidably mounted on said bar and its links adapted to engage in said slots of said flanges for locking longitudinally there, whereby an animal may be placed on its back in said cradle with its hips pressed against said tail-end wall and said chain engaged in a selected slot in one said flange may be drawn taut across said animal and engaged in a selected slot in the other said flange to hold said animal firmly in place.

2. The device of claim 1 wherein a cotter pin is inserted through the link of said chain to retain it laterally locked in a slot of the flange adjacent said bar.

3. The device of claim 2 wherein the first, end, link of said chain fits slidably around said bar and the third link engages the slot in the adjacent flange, the flange lying between the second and fourth links, said cotter pin being inserted above said flange through said third link and below the interlocking end of said fourth link.

4. An animal restraining device, comprising the combination of a supporting base; a narrow shallow cradle supported by said base and having a floor elevated at a head end and with a major portion sloped concavely downward therefrom toward a tail end and ending at a lower level than said tail end, and a minor portion sloping back from said tail end downward to said low end of said major portion, said cradle having a side wall on each side of said floor and a pair of spaced-apart substantially vertical end portions extending above said floor at said tail end; a stationary bar supported adjacent its ends in between said head and tail ends outside said cradle by one said side wall and sloping up toward said head end; a chain having one end slidably mounted on said bar; and a pair of parallel slotted members, one on each said side wall, said members sloping upwardly toward said head end and one said member being on the same side wall as and parallel to said bar, the links of said chain being adapted to engage in the slots of said slotted member for locking there.

5. An animal restraining device, comprising the combination of a supporting base; a narrow shallow cradle supported by said base and having a floor elevated at a head end and sloped concavely downward therefrom toward a tail end, said cradle having a side wall on each side of said floor and a pair of spaced-apart substantially vertical end portions extending above said floor at said tail end; a stationary bar supported adjacent its ends in between said head and tail end outside said cradle by one said side wall; a chain having one end slidably mounted on said bar; and a pair of slotted members, one on each said side wall, one said member being on the same side wall as and generally parallel to said bar, the links of said chain being adapted to engage in the slots of said slotted member for locking there.

References Cited in the file of this patent

UNITED STATES PATENTS

| | | |
|---|---|---|
| 93,062 | Crawford | July 27, 1869 |
| 1,400,486 | Huegerich | Dec. 13, 1921 |
| 1,417,230 | Cortez | May 23, 1922 |
| 1,970,178 | Michlun | Aug. 14, 1934 |
| 2,343,597 | Wachter | Mar. 7, 1944 |
| 2,520,585 | Walker et al. | Aug. 29, 1950 |
| 2,603,184 | Cook | July 15, 1952 |

FOREIGN PATENTS

| | | |
|---|---|---|
| 16,006 | Great Britain | 1889 |
| 21,607/35 | Australia | Mar. 27, 1936 |
| 109,599 | Australia | Jan. 16, 1940 |